Oct. 22, 1957  R. B. BENNETT ET AL  2,810,772
PROCESS FOR PRODUCTION AND RECOVERY OF PARAXYLENE
Filed Dec. 7, 1953  2 Sheets-Sheet 1
FIG. 1.
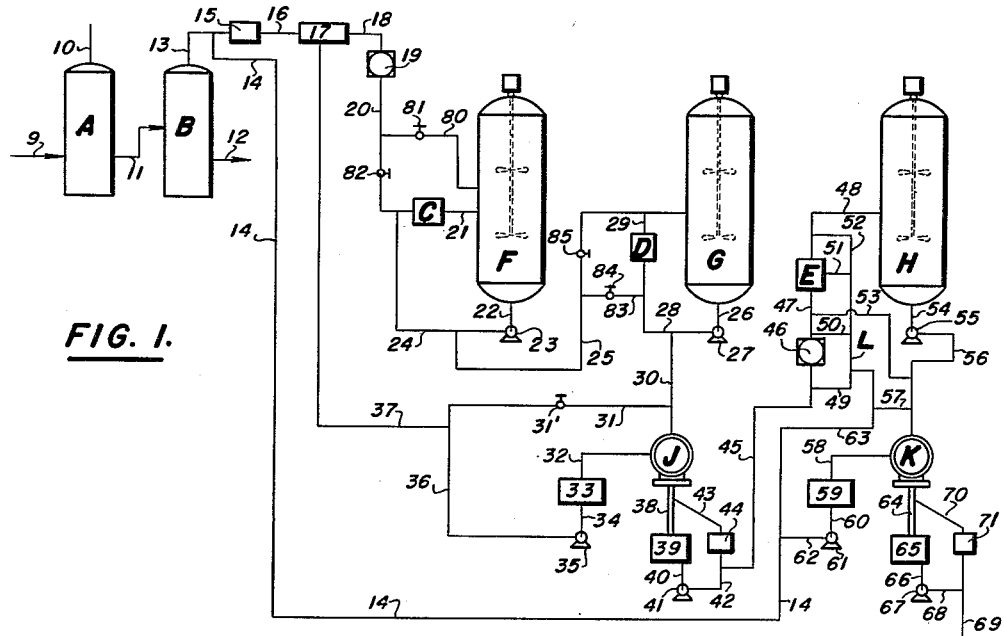
FIG. 2.
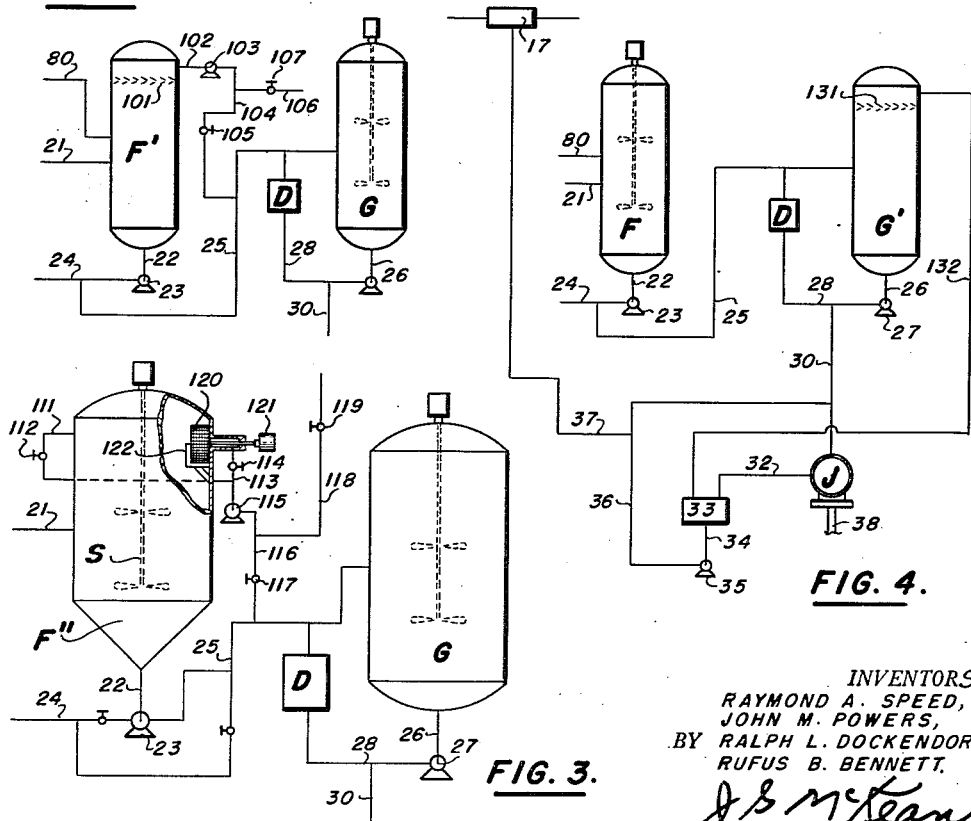
FIG. 3.
FIG. 4.
INVENTORS.
RAYMOND A. SPEED,
JOHN M. POWERS,
BY RALPH L. DOCKENDORFF,
RUFUS B. BENNETT.
ATTORNEY.

INVENTORS.
RAYMOND A. SPEED,
JOHN M. POWERS,
BY RALPH L. DOCKENDORFF,
RUFUS B. BENNETT,

ATTORNEY.

United States Patent Office 2,810,772
Patented Oct. 22, 1957

2,810,772

PROCESS FOR PRODUCTION AND RECOVERY OF PARAXYLENE

Rufus B. Bennett, Ralph L. Dockendorff, John M. Powers, and Raymond A. Speed, Baytown, Tex., assignors, by mesne assignments, to Esso Research and Engineering Company, Elizabeth, N. J., a corporation of Delaware Application December 7, 1953, Serial No. 396,528

10 Claims. (Cl. 260—674)

The present application is directed to a process for recovering high purity paraxylene from a mixture containing paraxylene and at least one other isomeric xylene.

In the process of the present invention a feed stock consisting of a mixture of hydrocarbons including ortho, meta, and paraxylenes is preferably distilled in a distillation zone to separate a higher boiling fraction containing orthoxylene and a minor portion of paraxylene and a lower boiling paraxylene fraction substantially free from orthoxylene. Two bodies of paraxylene slurry are maintained, the first body having a temperature of approximately —80° F. and the second body having a temperature of approximately —95° F. The lower boiling distillate fraction, after suitable precooling, is discharged as a continuous stream into the first body of slurry and maintained therein for an average residence time in the range of approximately 30 minutes to three hours. Paraxylene crystals and mother liquor are removed from the first body of slurry at the same rate the lower boiling distillate fraction is added thereto and continuously introduced into the second body of slurry. The average residence time of material in the second body of slurry is within the range of 30 minutes to three hours. Slurry consisting of mother liquor and paraxylene crystals is removed from the second body of slurry at the same rate the feed is added thereto from the first body of slurry with the amount of paraxylene crystals in the second body maintained at a constant value. The paraxylene crystals and motor liquor withdrawn from said second body are sent to a separating step and there separated into a filtrate fraction and a first cake of paraxylene crystals. The first cake is purified by melting, crystallizing and by holding in a holding tank at a time about 30 minutes at a temperature within the range of —10° to 20° F., separated in a second separating zone into a filtrate fraction and a second filter cake fraction which is removed as product from the system. In the process as described, it is desirable to operate the distillation zone so that the last increment of liquid which goes to said higher boiling fraction has substantially the same volume percent of paraxylene as does said filtrate fraction from the first separating zone.

In order to illustrate further specific operating conditions, examples of typical feed stocks are given in the following table:

Table I

| Analysis, Weight Percent | Stock A | Stock B |
|---|---|---|
| Toluene | 2.3 | 2.7 |
| Ethylbenzene | 17.6 | 21.0 |
| Paraxylene | 15.5 | 18.1 |
| Metaxylene | 40.0 | 46.4 |
| Orthoxylene | 20.3 | 11.0 |
| $C_9$ Aromatics | 3.0 | |
| Non-Aromatics | 1.3 | 0.8 |

If the feed stock A of Table I is used in the method as shown in Fig. 1 with second crystallization tank G operated at a temperature of —95° F., the compositions of the filtrate removed from first stage centrifuge J through line 31 and the filter cake discharged from centrifuge K through discharge chute 64 are as follows:

Table II

| Analysis, Wt. Percent | Filtrate | Filter Cake |
|---|---|---|
| Toluene | 2.5 | 0.1 |
| Ethylbenzene | 19.1 | 1.0 |
| Paraxylene | 8.2 | 95.0 |
| Metaxylene | 43.5 | 2.4 |
| Orthoxylene | 22.0 | 1.2 |
| $C_9$ Aromatics | 3.3 | 0.2 |
| Non-Aromatics | 1.4 | 0.1 |

If the feed stock A of Table I is used in the method shown in Fig. 1 with second crystallizing vessel G maintained at a temperature of —103° F., the compositions of the filtrate removed from first stage centrifuge J through line 32 and the filter cake discharged from centrifuge K through discharge chute 64 are as follows:

Table III

| Analysis, Wt. Percent | Filtrate | Filter Cake |
|---|---|---|
| Toluene | 2.5 | 0.1 |
| Ethylbenzene | 19.4 | 1.0 |
| Paraxylene | 7.1 | 95.0 |
| Metaxylene | 44.0 | 2.4 |
| Orthoxylene | 22.3 | 1.2 |
| $C_9$ Aromatics | 3.3 | 0.2 |
| Non-Aromatics | 1.4 | 0.1 |

If the feed stock B of Table I is used in the method shown in Fig. 1 with second crystallization vessel G operated at a temperature of —95° F., the compositions of the filtrate removed from first stage centrifuge J through line 32 and the filter cake fraction removed from centrifuge K through discharge chute 64 are as follows:

Table IV

| Analysis, Wt. Percent | Filtrate | Filter Cake |
|---|---|---|
| Toluene | 3.0 | 0.2 |
| Ethylbenzene | 23.6 | 1.3 |
| Paraxylene | 8.2 | 95.0 |
| Metaxylene | 52.0 | 2.8 |
| Orthoxylene | 12.3 | 0.6 |
| $C_9$ Aromatics | | |
| Non-Aromatics | 0.9 | 0.1 |

The invention will now be further described by reference to the drawing in which—

Fig. 1 is in the form of a diagrammatic flow sheet showing a method for carrying out the invention;

Fig. 2 is a fragmentary view in the form of a diagrammatic flow sheet showing steps which may be substituted for corresponding steps in the method carried out in Fig. 1;

Fig. 3 is a fragmentary view in the form of a diagrammatic flow sheet illustrating other steps which may be substituted for the corresponding steps carried out in Fig. 1;

Fig. 4 is a fragmentary view in the form of a diagrammatic flow sheet showing other steps which may be substituted for corresponding steps in the method of Fig. 1;

Figure 5:
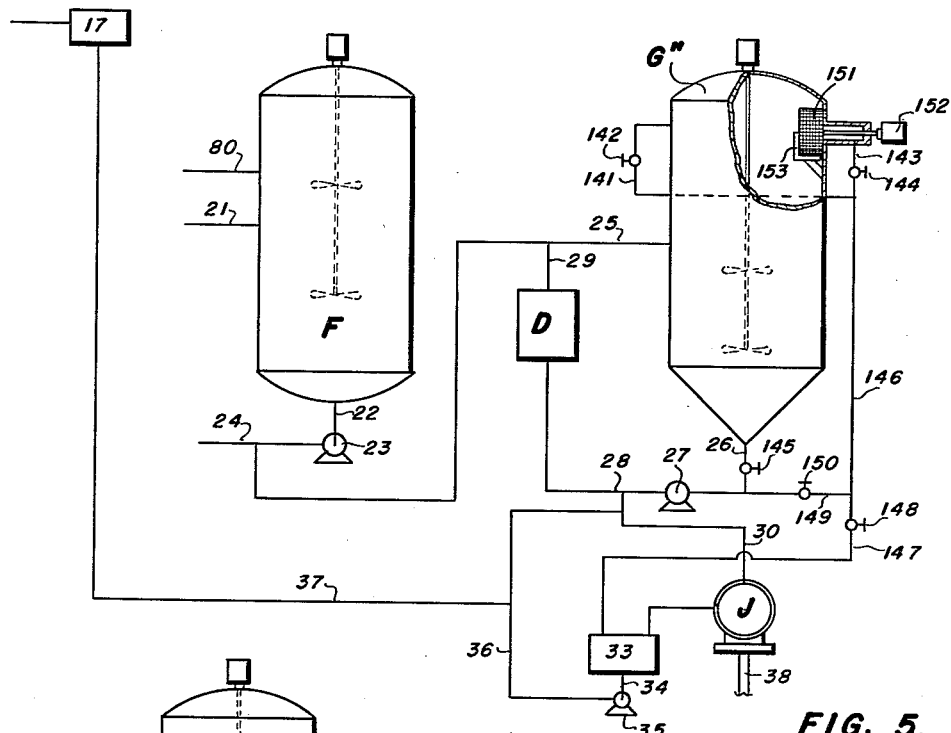
Fig. 5 is a fragmentary view in the form of a diagrammatic flow sheet showing other steps which may be substituted for corresponding steps in the method of Fig. 1.

Referring now to the drawing and first to Fig. 1, a feed stock consisting primarily of a mixture of aromatic hydrocarbons is fractionated in a distillation step shown schematically as carried out in towers A and B to concentrate the paraxylene therein. This distillation step is coordinated with the filtrate stream discarded from the system in the filtration step. In Fig. 1 the filtrate stream from the second centrifuge K is recycled while that from centrifuge J is discarded from the system. Thus, the distillation carried out in A and B is coordinated with the paraxylene content of the filtrate discarded from centrifuge J, as described and claimed in U. S. patent application Serial No. 396,394 entitled: "Process for Recovering Paraxylene," filed December 7, 1953, in the names of Pfennig, Meason and Newsom.

In the drawing, feed stock is introduced through inlet line 9 into distillation tower A where a light fraction is removed as overhead and discarded through outlet line 10 and the heavy fraction is introduced into distillation tower B where it is separated into a heavy fraction removed as bottoms and discarded from the system through outlet line 12 and a lighter fraction which is removed as overhead through line 13. Distillation tower B is operated so that the last increment taken as overhead for inclusion in stream 13 has the same paraxylene content as the filtrate discarded from the first centrifuge J through line 37.

The overhead fraction in line 13 by way of specific example may be taken to contain a mixture of ethylbenzene, paraxylene, metaxylene and orthoxylene. This fraction is ready to be sent to the chilling and crystallization portion of the system. The principal parts of the crystallization and separation system consist of first chiller C, second chiller D and third chiller E, first crystallization vessel F, second crystallization vessel G and third crystallization vessel H and first separation unit J and second separation unit K, which units may be basket centrifuges.

In the crystallization and separation procedure as carried out in the modification of the apparatus shown in Fig. 1, a substantially uniform slurry of paraxylene crystals and mother liquor is maintained at an average temperature of approximately −80° F. in first crystallization vessel F for an average residence time within the range of 30 minutes to three hours. A second substantially uniform slurry of paraxylene crystals and mother liquor at a temperature within the range of approximately −90° F. to −105° F., depending on the feed stock, is maintained in vessel G with an average residence time within the range of 30 minutes to three hours. The first and second slurries should preferably contain 25 to 60 volume percent of paraxylene crystals. A third substantially uniform slurry of paraxylene crystals and mother liquor is maintained at a temperature within the range of −10° to 20° F. in crystallization tank H for an average residence time of approximately 30 minutes. As will be seen in this drawing, vessels F, G and H are each provided with stirrers and usually the stirrer in each vessel will be operated slowly, say from 10 to 30 revolutions per minute, to maintain the slurry composition uniform and to aid crystal growth.

Chiller C, crystallization vessel F, chiller D and crystallization vessel G together with centrifuge J form the first stage while chiller E, crystallization vessel H, centrifuge K form the second stage.

The fraction in line 13 has admixed therewith filtrate from the second stage in line 14, the mixture passing through drier 15. The dried material is passed through line 16 to a heat exchanger 17 where it is cooled by indirect heat exchange with filtrate in line 37, then by line 18 to prechiller 19 where it is cooled to within a few degrees of the crystallization temperature of the mixture. The prechilled mixture from 19 is passed to line 20 and open valve 82 and is then admixed with from 2 to 20 volumes of paraxylene slurry for each volume of fresh feed recycled by line 24. The paraxylene crystals in the recycled slurry serve as seed crystals for the fresh feed. The resultant mixture is passed through scraped surface chiller C and then by line 21 into the first crystallization vessel F.

A slurry of paraxylene crystals and mother liquor is continuously withdrawn from the bottom of first crystallization vessel F by way of line 22 and pump 23 and the stream split with a portion passing through line 24 for admixture with the incoming mixture as heretofore explained and the remainder passing through line 25 and open valve 85 into the second crystallization tank G. A slurry of paraxylene crystals and mother liquor is continuously withdrawn from second crystallization tank G through line 26 and pump 27. From pump 27 the stream is split with a portion passing through line 28 to scraped surface chiller D, then through line 29 for admixture with the slurry in line 25 for return to said second crystallization vessel G. Another portion of the slurry of paraxylene crystals and mother liquor passes from outlet line 28 to line 30 where it may be diluted with filtrate introduced through line 31 to increase its fluidity and the diluted slurry passes into first basket centrifuge J. Line 31 is provided with valve 31′ so that the amount of diluent added to the slurry in line 30 may be controlled as desired.

In the first crystal separation step carried out in basket centrifuge J, a filtrate is separated which is removed by line 32 to surge drum 33. From surge drum 33 the filtrate is removed through line 34 and pump 35 to outlet line 36 where the stream is split with a portion going through line 31 for diluting the feed to centrifuge J as previously explained while the balance is passed through line 37 and in indirect heat exchange with incoming feed in heat exchanger 17 as previously explained before being discarded from the crystallization and separating system.

From centrifuge J a filter cake is withdrawn through discharge chute 38 into melting drum 39. The melted cake is withdrawn from melting drum 39 through line 40 by pump 41 having outlet line 42. The stream in line 42 is split with a portion passing through line 43 containing heater 44 and discharging into chute 38 for melting the filter cake removed as product from centrifuge J. The other portion is passed through line 45 to be fed into the crystallization tank H.

The paraxylene mixture in line 45 is passed through a prechiller 46, where it is chilled to a temperature immediately above its crystallization point, thence by line 47 to scraped surface heat exchanger E and then through line 48 to the third crystallization vessel H. In order to regulate the solids content of the slurry introduced into third crystallization vessel H, it is desirable to dilute it with filtrate from the second separation step K. For the purpose of introducing this filtrate a manifold L is provided having branches 49, 50, 51 and 52. As will be seen in the drawing, branch 49 discharges into line 45 ahead of prechiller 46; branch 50 discharges into line 57 between prechiller 46 and scraped surface chiller E; branch line 51 discharges into scraped surface chiller E while branch line 52 discharges into line 48 which is the outlet line of chiller E. Recycle slurry from vessel H may be introduced into line 47 by means of line 53 for the purpose of improving heat transfer by increasing velocity of flow in chiller E. The liquefied paraxylene concentrate being passed from centrifuge J through chiller E to third crystallization vessel H is preferably diluted with filtrate from the second stage centrifuge K so that the slurry formed in chiller E will contain approximately 20% solids or a total concentration of about 54% paraxylene. By way of example, two volumes of filtrate containing 50% paraxylene from second stage centrifuge K may be blended with one volume of first stage concentrate from centrifuge J containing about 75% paraxylene. However, if desired, the slurry formed in chiller E may contain more than 20% solids, with a maximum in the range of 30–35%.

Paraxylene slurry from the third crystallization tank H is withdrawn from the bottom thereof through line 54 to pump 55. This slurry is pumped to outlet line 56 and the stream may be split with a portion going to second stage separating step K and another portion optionally going to branch line 53 for addition to slurry in line 47. The slurry in outlet line 56 which is being discharged to the centrifuge is preferably diluted to increase its fluidity by the introduction of filtrate through branch line 57. In the second crystal separation step carried out in basket centrifuge K, a filtrate is separated and is removed through line 58 to surge drum 59. From surge drum 59 the filtrate is removed by outlet line 60 to pump 61 and pumped through line 62 with the stream split with one portion going through branch line 14 for admixture with fresh feed in line 13 while the other portion goes to branch line 63 and supplies the filtrate in manifold L for admixing with the paraxylene feed to third crystallization tank H and the other portion passes through branch line 57 for diluting the paraxylene slurry being fed to centrifuge K.

The filter cake removed by centrifuge K is the desired product from the system and passes through discharge chute 64 into melt tank 65. From melt tank 65 the melt is withdrawn through outlet line 66 to pump 67 where it discharges through outlet 68. A portion is withdrawn as desired product through branch outlet line 69 while the remainder passed through line 70 containing heater 71 and is discharged to the upper portion of discharge chute 64 to supply sufficient heat to the cake being discharged from centrifuge K to melt the crystals therein so that the mixture in melt tank 65 is liquefied.

As another method for operating the chilling system, a branch line 83 controlled by valve 84 connects line 25 with line 28. In this procedure, valve 84 is opened and valve 85 in line 25 is closed so that all the slurry being passed from first crystallization vessel F to second crystallization vessel G must pass through scraped surface chiller D before entering the second crystallization vessel G.

By way of specific example, when operating in accordance with the method shown in Fig. 1 the fresh feed may have from 15% to 18% by volume of paraxylene. The recycle added by line 14 to the fresh feed is about 7.8% by volume of the fresh feed. The mixture of recycle and fresh feed is prechilled, then admixed with paraxylene crystals in line 24 in the ratio of approximately 10 volumes of slurry to one volume of prechilled feed and the admixture then passed to scraped surface chiller C where it is chilled to a temperature of approximately —80° F., then discharged into tank F where it is held for approximately 1½ hours at —80° F. The slurry from tank F which is not recycled to chiller C is sent to tank G where it is maintained at a temperature within the range of —90° to —105° for an average holdup time of 1½ hours. The slurry from tank G is sent to first stage centrifuge J where it is separated into a filtrate fraction discarded from the system and the paraxylene fraction which is a concentrate for the second stage crystallization step. The liquefied paraxylene concentrate being passed from centrifuge J through chiller E to third crystallization vessel H is preferably diluted with filtrate from the second stage centrifuge K so that the slurry formed in chiller E will contain no more than approximately 20% solids or a total concentration of about 54% paraxylene. By way of example, two volumes of filtrate containing 50% paraxylene from second stage centrifuge K may be blended with one volume of first stage concentrate from centrifuge J containing about 75% paraxylene. In holding tank H a slurry at a temperature within the range of 0 to 10° F. is held for 30 minutes and is subsequently centrifuged in centrifuge K.

The procedure for removing water from the incoming feed has been described. In the remaining portion of the system it is essential to keep moisture out of the system to avoid icing and this may conveniently be done by using an inert gas blanket such as nitrogen, or $CO_2$ in holding tanks F, G, H, centrifuges J and K and the drums such as 33, 39, 59 and 65.

Alternative procedures for operating the crystallization tank in the first stage may be employed. An embodiment for carrying out this procedure is indicated in the embodiment of Fig. 2, which shows a fragmentary view of apparatus to be substituted for corresponding apparatus in the system of Fig. 1. In Fig. 2 two holding tanks F' and G correspond to crystallization tanks F and G of Fig. 1. Since the remainder of the system may be identical to that shown in Fig. 1 such parts have not been shown in order to simplify the showing.

In the embodiment of Fig. 2, the crystallization tank F' differs from the crystallization tank F of Fig. 1 in being provided with a baffle 101 near the top thereof and having an outlet line 102 connected to tank F above baffle 101, said line being connected to pump 103 and discharging through line 104 controlled by valve 105 into line 25 for discharge into second crystallization tank G. It will be noted that in Fig. 2 second crystallization tank G is shown as being provided with a stirrer and thus is identical in every respect to that shown in Fig. 1.

The arrangement shown in Fig. 2 enables a phase separation to take place in tank F' so that a high concentration of paraxylene slurry may be maintained in tank F' below partition 101 and a less concentrated paraxylene slurry may be in tank F' above partition 101. In this way the paraxylene slurry in tank F' below partition 101 may have a paraxylene crystal content within the range of 24% to 60% while the paraxylene crystal content of the slurry above partition 101 is substantially lower, the total paraxylene content of the slurry above partition 101 being substantially equal to the total paraxylene content of the material fed to crystallization tank F' so that the tank is in equilibrium as to paraxylene input and output but has a higher paraxylene content below partition 101 than does the feed thereto or output thereof to aid in the production of large easily filtered crystals.

In starting up the unit in embodiment of Fig. 2, the high paraxylene content in vessel F' below partition 101 may be maintained by introducing paraxylene crystals as such within this space or alternatively this crystal concentration may be built up by introducing feed stock into the vessel, allowing crystal growth to take place and withdrawing a less concentrated slurry from outlet 102 above partition 101, said slurry is withdrawn by pump 104, discharge line 105 and optionally may be discharged from the system through line 106 controlled by valve 107 until the paraxylene content in vessel F' below partition 101 has built up to the amount desired.

In the embodiment of Fig. 3, the crystallization tank F'' differs from the crystallization tank F of Fig. 1 in being provided with open side draw-off line 111 controlled by valve 112, filtered draw-off line 113 controlled by valve 114, the two lines discharging into pump 115. Pump 115 discharges into line 116 controlled by valve 117. Draw-off line 118 controlled by valve 119 is connected to line 116. The entrance to draw-off line 113 is protected by a small rotary filter 120 continuously rotated by prime mover 121 which may be a motor with a gear reduction to turn filter at about 1 R. P. M. and adhering crystals are continuously scraped from the filter by knife 122. The arrangement shown in Fig. 3 allows a high concentration of paraxylene slurry to be maintained in tank F''.

Vessel F'' is particularly designed to facilitate start-up operations. In starting up, the valve 112 is closed, valve 114 is opened and motor 121 is operating. Slurry is introduced through inlet line 21 and once the liquid level reaches the draw-off line, clear liquor is withdrawn through filter draw-off line 113. This liquor may be discarded from the system via draw-off line 118. As the operation proceeds, the crystal density in vessel F'' increases. By turning stirrer S at a suitable rate, a slurry of reasonable uniformity is maintained in the lower part of the vessel and a relatively thin slurry in the upper part. Once the desired crystal density is reached, valve 119 of draw-off line 118 may be closed, valve 112 may be opened and valve 114 closed to withdraw slurry via line 111 to the second crystallization tank G. It will be evident that valves 112 and 114 and pumps 115 and 23 may be manipulated to maintain in line 25 a paraxylene concentration equal to that in line 21. For example, clear liquor may be withdrawn through line 113 and combined with slurry from line 22 or the slurry withdrawn from line 111 may be thinned by adding clear liquor from line 113 or thickened by adding thick slurry from line 22. The use of vessel F″ permits continuous withdrawal of clear liquor from the system through draw-off line 118 controlled by valve 119 if desired thus permitting this quantity of liquor to by-pass the centrifuge.

Another mode for carrying out the present invention is shown in Fig. 4 which is a fragmentary view showing the first and second crystallization vessels which may be substituted for the corresponding crystallization vessels in Fig. 1. In Fig. 4 crystallization vessel F is identical to vessel F of Fig. 1 and is provided with identical connecting lines. However, the second crystallization vessel is designated as G′ and is provided with baffle 131 near the top thereof. An outlet line 132 is connected to crystallization tank G′ above baffle 131 and is connected to discharge line 32 of centrifuge J. In the embodiment of Fig. 4, a liquid having a low concentration of paraxylene crystals may be withdrawn from tank G′ above baffles 111 by means of outlet line 132 and discharged to filtrate surge drum 33. This reduces the load on the centrifuge J by charging a more concentrated paraxylene slurry thereto.

Another mode for carrying out the present invention is shown in Fig. 5 which is a fragmentary view showing the first and second crystallization vessels which may be substituted for the corresponding crystallization vessels in Fig. 1. In Fig. 5 crystallization vessel F is identical to vessel F of Fig. 1 and is provided with identical connecting lines. However, the second crystallization vessel is designated as G″ and is provided with open side draw-off line 141 controlled by valve 142, filtered draw-off line 143 controlled by valve 144 and bottom draw-off line 26 controlled by valve 145 discharging to centrifugal pump 27. Draw-off lines 143 and 141 discharge into line 146 which in turn is branched with one branch 147 controlled by valve 148 discharging into surge drum 33 and the other branch 149 controlled by branch 150 discharging into the inlet of centrifugal pump 27. The entrance to draw-off line 143 is protected by a small rotary filter 151 continuously rotated by prime mover 152 which may be a motor with a gear reduction to turn the filter at about 1 R. P. M. and adhering crystals are continuously scraped from the filter by knife 153. Vessel C″ is particularly designed to facilitate start up operation. In starting up, valves 142 and 145 are closed, valve 144 is opened and motor 152 is operating. Slurry is introduced through line 25 and once the liquid level reaches the draw-off line, clear liquor is withdrawn through filtered draw-off line 143. This liquor may be discarded from the system via line 146 through opened valve 148, line 147, surge tank 33, line 34, pump 35 and lines 36 and 37, line 26 being closed by valve 145 and line 149 being closed by valve 150. As the operation proceeds the crystal density in vessel G″ increases. By turning stirrer S at a suitable rate, a slurry of reasonable uniformity is maintained in the lower part of the vessel and a relatively thin slurry in the upper part. Once the desired crystal density is reached valves 142, 145 and 150 may be opened and valves 144 and 148 may be closed to withdraw slurry to the centrifuge. It is evident that valves 142, 144 and 145 may be manipulated to maintain in line 28 a paraxylene concentration equal to that in line 25. For example, clear liquor may be withdrawn through line 146 and combined with the slurry from line 26 or the slurry withdrawn from line 141 may be thinned by adding clear liquor from line 143 or thickened by adding thick slurry from line 26.

Further it will be seen that by manipulating valve 148 clear liquor may be continuously withdrawn from the system and discarded thus permitting this quantity of liquor to by-pass centrifuge J so that it is not necessary to pass through centrifuge J all of the material fed into vessel G″ by way of inlet line 25.

Figure 6:
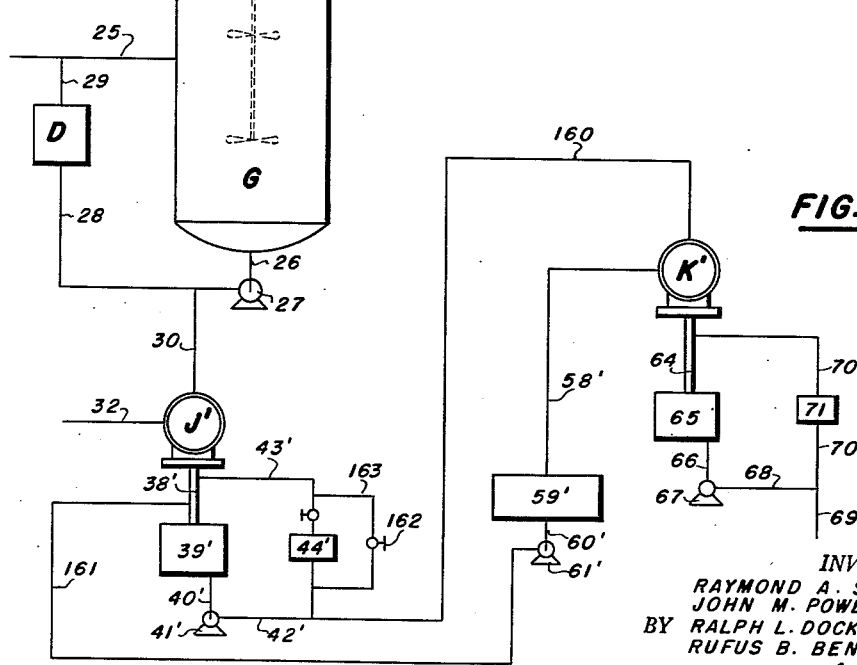
Fig. 6 is a fragmentary view in the form of a diagrammatic flow sheet showing other steps which may be substituted for corresponding steps in the method of Fig. 1.

An alternative procedure for carrying out the method of the present invention is shown in the fragmentary view of Fig. 6 in which the unit shown may be substituted for corresponding units in Fig. 1. In Fig. 6 parts identical to corresponding parts in Fig. 1 are identified by the same reference characters. As seen in Fig. 6, slurry from the second crystallization vessel G is withdrawn through line 26, pump 27, line 28 and line 30 and discharged to first stage centrifuge J′ from which filtrate is withdrawn through line 32 and a filter cake is discharged through discharge chute 38′. The cake in discharge chute 38′ is partially melted by the introduction of melted concentrate therein through line 43′ the partially melted cake discharging into crystal melt tank 39′ which is operated as an agitated slurry holding tank. Slurry from tank 39′ is withdrawn through line 40′ and pump 41′ to line 42′ where the stream is split with a portion recycled through line 43′ and heater 44′ to serve as the heating medium to melt a portion only of the cake being discharged from first stage centrifuge J′ while the remainder is passed through line 160 to second stage centrifuge K′. In centrifuge K′ a filtrate fraction is separated and is withdrawn through line 58′ to holding tank 59′ and thence through line 60′ and pump 61′ to line 161 which introduces second stage filtrate into the first stage cake being discharged into chute 38′. Sufficient filtrate from line 161 is added to the cake in chute 38′ to maintain the cake as a pumpable slurry, say 20% crystals at 0° F. It will be noted that by the use of filtrate from second stage centrifuge K′, the amount of melted filter cake being recycled to chute 38′ may be reduced. This may be done by opening valve 162 in by-pass line 163 around heater 44′ and closing valve 164. Sufficient filtrate may be added through line 161 to allow heater 44 to be by-passed altogether. Since centrifuge K′ charges only part of the time, by-pass line 163 controlled by valve 162 serves the purpose of recycling slurry to tank 39 when centrifuge K′ is not being charged. The filter cake from second stage centrifuge K′ is discharged to chute 64 and melt tank 65 which may be operated in a manner identical to the corresponding melt tank in Fig. 1 with melted product withdrawn through line 66, pump 67, line 68 and branch line 69 as product from the system and melted cake being recycled through line 70 containing heater 71 to fluidize the paraxylene slurry in discharge chute 64.

While specific examples have been given as to the practice of the present invention, these examples are given by way of illustration only and not by way of limitation with regard to the invention claimed herein.

What is desired to be secured by Letters Patent is:

1. A continuous process for recovering paraxylene from a feed stock consisting of a liquid mixture of hydrocarbons including paraxylene in the range of from about 15% to 25% by volume and at least one other isomeric xylene which comprises the steps of establishing a first body of slurry consisting of paraxylene crystals and mother liquor and continuously maintaining said first body of slurry at a temperature of about −80° F., establishing a second body of slurry consisting of paraxylene crystals and mother liquor and continuously maintaining said second body of slurry at a temperature of about −90° to about −105° F., continuously charging a stream of said feed stock to said first body of slurry, continuously charging a transfer stream of first body slurry to said second body, continuously removing a discharge stream from said second body slurry and separating a cake of paraxylene crystals from said discharge stream of second body slurry, said transfer stream and said discharge stream being removed, respectively, from said first and second bodies at the same rate at which said feed stock is charged to said first body, said transfer stream and said discharge stream being removed, respectively, from said first and second bodies at a rate sufficient to provide for an average slurry residence time of from about 0.5 to 3 hours in each of said first and second bodies.

2. A process as in claim 1 wherein said second body of slurry is maintained at a temperature of about −90° F.

3. A process as in claim 2 wherein said second body of slurry contains from about 25 to 60 volume percent of paraxylene crystals.

4. A process as in claim 2 wherein said first body contains from about 25 to 60 volume percent of paraxylene crystals.

5. A process as in claim 2 wherein said first body of slurry contains about 25 to 60 volume percent of paraxylene crystals and said second body contains about 25 to 60 volume percent of paraxylene crystals.

6. A continuous process for recovering paraxylene from a charge stock consisting of a mixture of hydrocarbons including ortho-, meta-, and paraxylenes which comprises the steps of distilling said charge stock in a distillation zone to separate a higher boiling fraction containing orthoxylene and paraxylene and a lower boiling overhead feed stock fraction containing paraxylene and a reduced amount of orthoxylene, establishing a first body of slurry consisting of paraxylene crystals and mother liquor and continuously maintaining said first body of slurry at a temperature of about −80° F., establishing a second body of slurry consisting of paraxylene crystals and mother liquor and continuously maintaining said second body of slurry at a temperature of about −90° to about −105° F., continuously charging a stream of said feed stock to said first body of slurry, continuously charging a transfer stream of first body slurry to said second body, continuously removing a discharge stream from said second body slurry, continuously separating said discharge stream into a first cake of paraxylene crystals and a first filtrate fraction, melting said first cake, crystallizing said melt and separating it into a second paraxylene filter cake fraction and a second filtrate fraction, said transfer stream and said discharge stream being removed, respectively, from said first and second bodies at the same rate at which said feed stock is charged to said first body, said transfer stream and said discharge stream being removed, respectively, from said first and second bodies at a rate sufficient to provide for an average slurry residence time from about 0.5 to 3 hours in each of said first and second bodies, said distillation zone being operated to provide an overhead feed stock fraction cut at a point such that the incremental portion thereof at the cut point has the same volume percent of paraxylene as does said first filtrate fraction.

7. A process as in claim 6 wherein said second body is maintained at a temperature of −95° F.

8. A process as in claim 7 in which said second body contains from about 25 to 60 volume percent of paraxylene crystals.

9. A process as in claim 7 wherein said first body contains from about 25 to 60 volume percent of paraxylene crystals.

10. A process as in claim 7 wherein said first body of slurry contains about 25 to 60 volume percent of paraxylene crystals and said second body contains about 25 to 60 volume percent of paraxylene crystals.

References Cited in the file of this patent

UNITED STATES PATENTS

| | | |
|---|---|---|
| 2,435,792 | McArdle et al. | Feb. 10, 1948 |
| 2,532,276 | Birch et al. | Dec. 5, 1950 |
| 2,688,045 | Powers et al. | Aug. 31, 1954 |